United States Patent
Egli et al.

(10) Patent No.: US 9,242,767 B2
(45) Date of Patent: Jan. 26, 2016

(54) POLYFOIL TUBE MADE FROM SEMI-RIGID OR RIGID FOIL MATERIALS

(75) Inventors: Gallus Egli, Bleiken b. Oberdiessbach (CH); Martin Maurer, Steffisburg (CH); Simon Stampfli, Uetendorf (CH); Roland Graf, Konolfinmgen (CH); Philippe Kern, Rubigen (CH)

(73) Assignee: HOFFMANN NEOPAC AG, Thun (CH)

( * ) Notice: Subject to any disclaimer, the term of this patent is extended or adjusted under 35 U.S.C. 154(b) by 97 days.

(21) Appl. No.: 13/322,497

(22) PCT Filed: May 26, 2009

(86) PCT No.: PCT/CH2009/000177
§ 371 (c)(1),
(2), (4) Date: Feb. 3, 2012

(87) PCT Pub. No.: WO2010/135843
PCT Pub. Date: Dec. 2, 2010

(65) Prior Publication Data
US 2012/0118942 A1 May 17, 2012

(51) Int. Cl.
*B65D 35/10* (2006.01)
*B65D 35/02* (2006.01)
(Continued)

(52) U.S. Cl.
CPC .......... *B65D 35/02* (2013.01); *B29C 45/14336* (2013.01); *B29C 45/14598* (2013.01);
(Continued)

(58) Field of Classification Search
CPC ........ B65D 35/05; B65D 35/00; B65D 35/10; B65D 35/12; B29L 2023/20
USPC .............................. 428/35.4; 222/92; 206/277
See application file for complete search history.

(56) References Cited

U.S. PATENT DOCUMENTS 3,556,887 A    1/1971   Adcock et al.
3,660,194 A *   5/1972   Hoffmann et al. ............ 156/191
(Continued)

FOREIGN PATENT DOCUMENTS

CH           476565 A    8/1969
GB       1 198 801 A    7/1970
(Continued)

OTHER PUBLICATIONS

Johnston, David, Master, Kim, Green Living, "Which Plastics are Safe," Feb. 2008. (http://web.archive.org/web/20080224050214/http://www.care2.com/greenliving/which-plastics-are-safe.html).*
(Continued)

*Primary Examiner* — Walter B Aughenbaugh
(74) *Attorney, Agent, or Firm* — Millen, White, Zelano, Branigan, P.C.

(57) ABSTRACT

A preferably air-tight and liquid-tight collapsible container comprises a container body (5) formed of a sheet material, said sheet material having two thermoplastic surfaces (2, 3), said sheet material comprising a preferably fluid-tight carrier foil (1) provided at least on and preferably on both sides (2, 3), with a thermoplastic semi-rigid or rigid layer material, preferably a polyester based material said sheet material being folded to a container-like body and sealed in the overlapping edge regions (6, 7) to form a container-like body, said container-like body being coated with a sheathing (9) of elastomeric thermoplastic material of the same kind or type as the foil material to form a container body (5), said container body (5) being provided at one open end (5a) with a container head formed from thermoplastic material of the same kind or type as the foil material.

24 Claims, 1 Drawing Sheet

(51) Int. Cl.
- B29C 45/14 (2006.01)
- B29D 23/20 (2006.01)
- B65D 35/12 (2006.01)
- B29C 53/38 (2006.01)
- B29C 63/18 (2006.01)
- B29L 9/00 (2006.01)
- B29L 23/20 (2006.01)

(52) U.S. Cl.
CPC ............... B29D23/20 (2013.01); B65D 35/10 (2013.01); B65D 35/12 (2013.01); *B29C 53/38* (2013.01); *B29C 63/18* (2013.01); *B29K 2995/0069* (2013.01); *B29L 2009/003* (2013.01); *B29L 2023/20* (2013.01)

(56) References Cited

U.S. PATENT DOCUMENTS

| | | | |
|---|---|---|---|
| 3,946,905 A * | 3/1976 | Cogliano | ............... 222/107 |
| 4,226,337 A | 10/1980 | Abbott | |
| 4,261,482 A | 4/1981 | Yamada et al. | |
| 4,265,948 A | 5/1981 | Hayes et al. | |
| 4,595,612 A * | 6/1986 | Tavss et al. | ............... 222/92 |
| 6,670,429 B2 * | 12/2003 | Appelman et al. | ......... 525/444.5 |
| 2002/0143102 A1 * | 10/2002 | Sasano et al. | ............... 524/589 |
| 2008/0257909 A1 | 10/2008 | Wang et al. | |

FOREIGN PATENT DOCUMENTS

| | | |
|---|---|---|
| GB | 1 199 403 A | 7/1970 |
| GB | 2 048 209 A | 12/1980 |
| WO | 2008/122953 A2 | 10/2008 |

OTHER PUBLICATIONS

Holden, G. 2002. Thermoplastic Elastomers. Kirk-Othmer Encyclopedia of Chemical Technology. (http://onlinelibrary.wiley.com/doi/10.1002/0471238961.2008051808151204.a01.pub2/full).*

International Search Report, dated Mar. 18, 2010, issued in corresponding PCT/CH2009/000177.

Written Opinion, dated Mar. 18, 2010, issued in corresponding PCT/CH2009/000177.

* cited by examiner

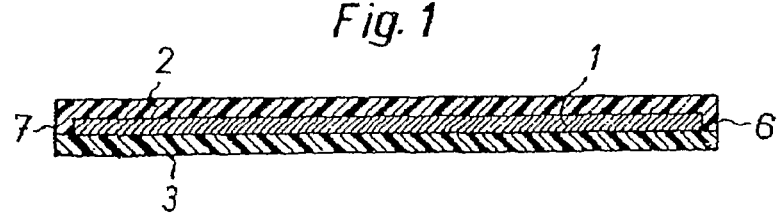
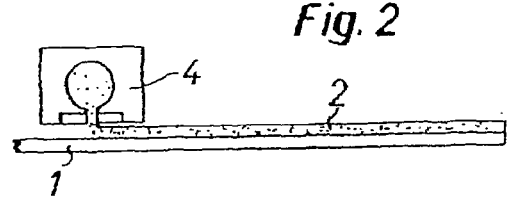
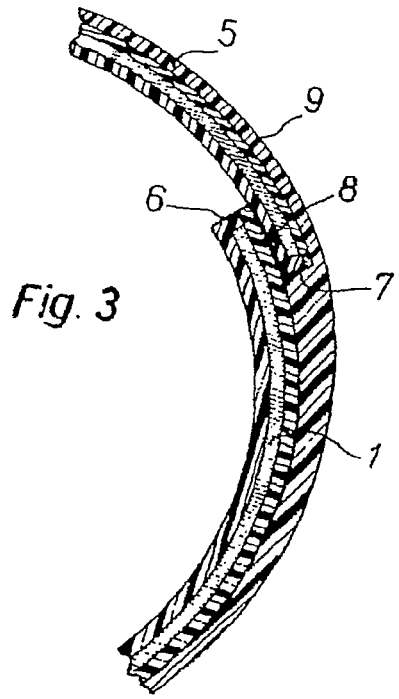
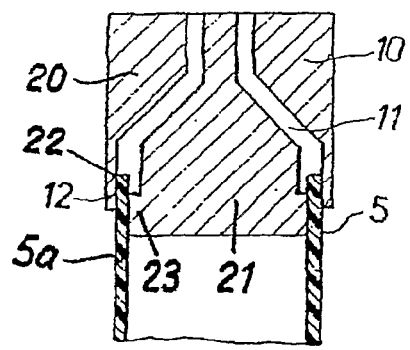

POLYFOIL TUBE MADE FROM SEMI-RIGID OR RIGID FOIL MATERIALS

TECHNICAL FIELD

The present invention relates to an improved in particular gas-tight and liquid-tight collapsible container, especially to collapsible tubes made from semi-rigid or rigid foil material as well as to a method for the production thereof.

BACKGROUND ART

Flexible containers consisting of plastic, particularly collapsible tubes for substances such as pastes, jellies, emulsions, liquids, foams, powders, etc., have been heretofore produced by injection molding, extrusion or blowing of plastic to the desired shape. Such techniques, however, have the disadvantage that when using materials best suited for injection molding and which are flexible in polymerized condition, such as for example polyethylene, PVC, PVDC, there are obtained container walls which are rather well permeable to gas. Consequently, the substances filled into the thus produced containers tend to alter after prolonged storage (oxidation, loss of water or other low boiling solvent or ingredient, etc.), and thus, will become useless.

Another significant drawback of these manufacturing techniques for collapsible tubes resides in the actual heading of the tube, that is, the provision of the tube with a closure portion or end. Tubes formed by such methods are not sufficiently formed as to shape and dimension that they can be readily introduced, as such, into a mold cavity for applying the tube cap or head. Consequently, these techniques need specially designed and sealed molds.

The problems of these tubes have been addressed and to a large extent solved by U.S. Pat. No. 3,660,194. Said patent describes a method for the production of fluid-tight collapsible tubes provided with a tube heading. Said method comprises the steps of coating an impervious, substantially strip-shaped carrier foil on at least one side with heat-sealable plastic, forming the coated carrier foil to the shape of the container body by overlapping and heat-sealing adjacent edges of the coated carrier foil, and applying a plastic sheathing over the heat-sealed container body to cover the outside of the container body such that the shape and dimension of the outside surface of the sheathed container body substantially correspond to the shape and dimension of an inner wall of an outer mold part of a tube heading mold, then sealingly inserting an open end portion of the sheathed container body into the mold cavity of the tube heading mold, and with the inner wall of the open end portion of the container body being spaced from an inside wall of an inner mold part, such that by introducing moldable plastic material into the mold cavity said material is formed into the tube heading and brought into contact with the open end portion of the container body, thereby applying substantially radially directed forces to the spaced inner wall of the container body to further urge the outside surface of said end portion of the container body against the inner wall of the outer mold part to thereby prevent escape of moldable plastic material out of the mold cavity, and resulting in a tight connection between the tube heading and the tube body.

Although the method described in U.S. Pat. No. 3,660,194 solves a lot of the problems encountered with other tubes, said method so far was limited to flexible plastics. Since such flexible plastic materials are not compatible with all desired filling substances, there exists a substantial risk that the filled-in substances, due to their contact with the container wall, are subject to chemical reactions or changes, or to alterations in taste or smell, or to changes of consistency, which alterations or changes may reduce their life-time and/or even prevent their intended use. Or the flexible tube materials may be damaged by aggressive filling substances leading to e.g. delamination of laminate.

Thus, there is still a need for a broader variety of collapsible containers, preferably gas-tight and liquid-tight collapsible containers, especially collapsible tubes.

DISCLOSURE OF THE INVENTION

Hence, it is a general object of the invention to provide a preferably gas-tight and liquid-tight collapsible container, especially a collapsible tube that in contact to the filled-in goods has a harmless stable surface made of thermoplastic material.

It is another object of the invention to provide a method for producing such a container tube.

Now, in order to implement these and still further objects of the invention, which will become more readily apparent as the description proceeds, the collapsible container is manifested by the features that it comprises a container body formed of a sheet material with both surfaces formed from thermoplastic semi-rigid or rigid layer material, said sheet material comprising a carrier foil, said sheet material being folded to a container-like body and sealed in the overlapping edge regions, said container-like body having an outer surface coated with a sheathing of elastomeric thermoplastic material of the same kind or type as the layer material to form the container body, said container body being provided at one open end with a container head formed from thermoplastic material of the same kind or type as the layer material.

In a preferred embodiment the collapsible container is formed from a carrier foil consisting of or containing a functional barrier layer. Such carrier foil consisting of or containing a barrier layer is also termed barrier foil. A carrier foil or a functional barrier foil that is sandwiched between two thermoplastic semi-rigid or rigid layers, e.g. semi-rigid or rigid thermoplastic foils or coatings, is termed sheet material.

The functional barrier layers may have diverse effects. They may add to the mechanical properties of the collapsible container and/or make the collapsible container air-tight and liquid-tight (further on referred to as fluid-tight). In order to obtain an increased safety in protecting the container content from coming into contact with the barrier layer even when, for instance, the thermoplastic layer applied to the carrier foil is defective or, for instance, contains pores or openings, it can be desirable to provide the side of the barrier foil facing the container contents with a further barrier layer (protective barrier layer or sheet) to generate a composite barrier foil also comprising a protective barrier layer prior to the application of the thermoplastic layer to form the sheet material as heretofore described. Hence, a protective barrier layer of a "harmless" metal or plastics, such as for instance aluminum, polyester, polyamide (PA), cycloolefin copolymers (COC) and so forth, can be laminated to or bonded to the barrier layer to form the barrier foil.

Suitable thermoplastic materials are homopolymers and copolymers of polyester and polyamides, and cycloolefin copolymers. A preferred thermoplastic material is a polyester material, in particular polyethyleneterephthalate (PET). A preferred PET is a PET homopolymer approved for application in contact with pharmaceuticals, such as the PET known as PET-P.

Suitable barrier materials, in particular for the production of fluid-tight containers, are aluminum foils, $SiO_x$, $Al_xO_y$, ethyl vinyl alcohols (EVOH), COC and PA.

In case of aluminum foils, an exemplary sheet material is composed of an aluminum foil sandwiched between two thermoplastic foils, e.g. a laminate composed of thermoplastic foil-adhesive layer-aluminum foil-adhesive layer-thermoplastic foil.

In case of a carrier foil comprising a $SiO_x$ layer, the sheet material may be composed of thermoplastic foil-adhesive-$SiO_x$ coated side of the carrier foil.

If the carrier foil comprises a suitable thermoplastic foil such as a PET foil, no further thermoplastic layer needs to be added on this thermoplastic material. However, it is also possible—and often preferred—to have a further thermoplastic foil laminated to the second side of the barrier foil as well, i.e. a sheet material with the layers thermoplastic-foil-adhesive-$SiO_x$ coated side of barrier-carrier-adhesive-thermoplastic foil.

PET is a thermoplastic polymer resin of the polyester family broadly used in beverage, food, pharmaceutical and other containers used for liquid or pasty contents. It is broadly applied in thermoforming applications and available in a broad variety of purities, tensile modulus, and other characteristics.

PET can be semi-rigid to rigid, depending on its thickness, and is lightweight (although it has higher density than polyolefins such as PE and PP). It makes a good gas and fair moisture barrier, as well as a good barrier to alcohol—provided that it has been subjected to a barrier treatment—and other solvents. It is strong and impact-resistant. It is naturally colorless with high transparency.

It is known to coat PET with aluminium to reduce its permeability, and to make it reflective and opaque. PET bottles are known to be excellent barrier materials and they are widely used for soft drinks. For certain specialty bottles, PET may sandwich a metal or polyvinyl alcohol layer or foil or a $SiO_x$ or $Al_xO_y$ coated foil to further reduce its oxygen permeability as described above.

One of the most important characteristics of the thermoplastic material, e.g. the PET, in the scope of the present invention is the tensile modulus. The tensile modulus in general is greater than 1500 MPa, preferably greater than 1800 MPa, more preferred greater than 2100 MPa as determined according to the norm EN ISO 527-1. A very suitable thermoplastic material is e.g. a PET-P with tensile modulus of about 2800 MPa to about 3000 MPa.

PET is hygroscopic, meaning that it naturally absorbs water from its surroundings. However, when this 'damp' PET is then heated hydrolysis takes place between the water and the PET which reduces its molecular weight and its physical properties. Thus, before the resin can be processed in a molding machine, or prior to heat sealing the sheet material, as much moisture as possible must be removed from the resin. This is achieved through the use of a desiccant or dryers before the PET is fed into the processing equipment.

A method for drying PET inside a dryer, uses pumping of hot dry air into the bottom of a hopper containing the resin so that it flows up through the pellets, removing moisture on its way. The hot wet air leaves the top of the hopper and is first run through an after-cooler, because it is easier to remove moisture from cold air than hot air. The resulting cool wet air is then passed through a desiccant bed. Finally the cool dry air leaving the desiccant bed is re-heated in a process heater and sent back through the same processes in a closed loop. Typically residual moisture levels in the resin must be less than 40 parts per million (parts of water per million parts of resin, by weight) before processing. Dryer residence time should not be shorter than about four hours. This is because drying the material in less than 4 hours would require a temperature above 160° C., at which level hydrolysis would begin inside the pellets before they could be dried out.

Such drying is preferably applied prior to coating the carrier foil and/or prior to sealing the tuber-like body and or prior to molding the container head.

In addition to pure (homopolymer) PET, PET modified by copolymerization is also available and may be used as layer material in the sheet material although the use of pure PET is preferred.

PET in its natural state is a crystalline resin. Clear products can be produced by rapidly cooling molten polymer to form an amorphous solid. Like glass, amorphous PET forms when its molecules are not given enough time to arrange themselves in an orderly fashion as the melt is cooled. At room temperature the molecules are frozen in place, but if enough heat energy is put back into them, they begin to move again, allowing crystals to nucleate and grow. This procedure is known as solid-state crystallization. The products used as layer materials in the carrier (sheet material) are crystalline or partially crystalline.

Besides these PET materials there also exist thermoplastic polyester elastomers, also known as thermoplastic copolyesters, usually abbreviated as TPE-E or TPC. Such materials are e.g. produced from 1,4-butanediol, terephthalic acid and polytetrahydrofurane. The resulting copolymers comprise hard segments of crystalline tetramethylene glycolterephthalate and soft, amorpheous segments of polyalkyleneetherterephthalate. The production may be made in the melt through trans esterification. The characteristics of these materials are high mechanical strength, high flexibility and impact resistance also in cold environment, high wear resistance, high resistance to chemicals and aging, good recovery after deformation under pressure and/or tear, easy processability. In order to improve UV stability, heat stability, hydrolytic stability and flame retardance additives may be added. The mechanical properties of TPEE/TPC materials suitable for use in the scope of the present invention are also defined by their tensile modulus. This modulus in general is much lower than the modulus of the layer material used in the carrier foil (sheet material), usually in the range from 50 to 1000 MPa, for tubes or other similarly collapsible containers preferably in the range of 150 to 500 MPa as determined according to the norm EN ISO 527-1. A very suitable thermoplastic elastomeric material is e.g. a TPE-E/TPC with tensile modulus of about 180 MPa to about 400 MPa.

Although the invention further on is primarily described for polyester materials, the present invention is not limited to such materials but encompasses all semi-rigid to rigid thermoplastic layer materials for which also family members with elastomeric properties are known so that by an elastomeric coating of the container-like body those characteristics that are important for collapsible tubes can be achieved in spite of the rigidity of the sheet material used.

In the context of this invention, family members of a material or materials of the same type or kind designate the same group of materials, namely materials the basic ingredients of which are such that they are compatible. Compatible means that adhesion can be achieved between two materials thereby providing a physical connection between the two materials. Preferred compatible family members are e.g. PET homopolymers, copolyesters and thermoplastic polyester elastomer (TPE-E or TPC), or copolyester 1, copolyester 2 and TPE-E/TPC.

A method suitable and preferred for manufacturing fluid-tight containers or tubes of the present invention is essentially described in U.S. Pat. No. 3,660,194. Said method comprises the steps of preparing a sheet material with thermoplastic surfaces on both sides (e.g. by laminating or coating a substantially strip-shaped impervious barrier foil), said thermoplastic material being suitable for being heat sealed. The sheet material is then formed into the shape of the container-like body and adjacent overlapping edges of the coated carrier foil forming such container-like body are heat-sealed at such location. A plastic sheath of elastomeric material is then applied in a controlled fashion over the heat-sealed container-like body, to cover the outside of the body and to provide the collapsible container body. The sheathing may be applied in one or more identical or different layers, wherein such different layers are identical with regard to their base material, i.e. they all comprise e.g. a thermoplastic polyester elastomer (TPE-E/TPC) base material but may contain different fillers as e.g. already mentioned above and/or different pigments or dyes etc., or they may remain unfilled. In general, such container body has a smooth outer surface and it may be readily capable of receiving an imprint.

According to a significant aspect of this invention, the amount of elastomeric plastic sheathing material applied to the container body and the ultimate shape of such container body is controlled so that the thickness is sufficient to provide the container body with the desired overall elasticity and to ensure that the outside surface possesses a dimension and configuration substantially corresponding to the inner wall of a mold cavity of a mold serving to head the container, in particular the tube.

Suitable dimensions for obtaining collapsible characteristics are:

| | |
|---|---|
| thickness of the sheet material, preferably a laminate | 50 to 250 μm |
| rigid or semi-rigid thermoplastic polymer, such as polyester, preferably PET, in both sides laminated carrier foil | 10 to 100 μm |
| adhesive between barrier foil (e.g. metal foil) and thermoplastic foil | 3 to 10 μm |
| thickness of barrier (e.g. metal) foil | 5 to 50 μm |
| thickness of elastomeric sheathing | 50 to 400 μm |
| overall thickness of the container body | 150 to 500 μm | in a preferred embodiment:

| | |
|---|---|
| thickness of the laminate | 80 to 100 μm |
| polyester, preferably PET-P, in both sides coated laminate | 30 μm |
| adhesive between metal foil and coating | 3 to 10 μm |
| thickness of aluminum foil | 12 to 20 μm |
| thickness of elastomeric sheathing | 150 to 400 μm |
| overall thickness of the container body | 150 to 500 μm |

The heading operation is now described in detail for a collapsible tube. The same method, however, can be applied for heading other fluid-tight collapsible containers.

Prior to the actual tube heading operation, the tube body produced as described above is preferably cut into finite tube lengths, each of which possesses—at least at the end region thereof destined to be inserted into the mold cavity—an outside surface whose configuration and dimension substantially corresponds to the internal receiving wall of the molding cavity. Thereafter, the tube section is inserted at one end into the mold cavity, bearing snugly by means of its outside surface against the inner wall of the molding cavity provided by the outer mold part while the actual inside wall of the end portion of the thus-inserted tube section is spaced from an inner wall of an inner mold part such that upon filling the mold cavity with head forming material this inside wall is exposed to the head forming material. Thereafter, plastic material for heading the tube section is introduced into the mold, flowing through the mold cavity into the region of the exposed inner wall of the exposed tube section. This plastic material, which is under pressure, acts against the inner wall of the tube section to exert a radially directed force which further seats the outside surface of the tube section received within the mold cavity against the internal or inner receiving wall of the mold cavity itself, to thus provide an effective seal preventing the penetration of moldable plastic material externally of the mold itself. Due to the controlled shaping of the tube section, prior to the time that it is capped or headed, and specifically wherein the external diameter of such tube section is only slightly less than the internal diameter of the receiving cavity of the mold itself, it is possible to apply the heading to the tube section without resorting to complicated sealing arrangements or mold structures inasmuch as the tube section itself in cooperation with the inner receiving wall of the mold provides the seal.

Suitable cap or head material is compatible with the layer and the sheathing material. For PET, a suitable cap or head material is PET or a copolyester, usually a medical grade copolyester with a tensile modulus of greater than 1500 MPa, preferably greater than 1800 MPa, more preferred greater than 2100 MPa as determined according to the norm EN ISO 527-1. In case of more than 5% deviation of the tensile modulus determined by these two methods, the mean value of both results is relevant. A very suitable thermoplastic material is e.g. a copolyester with tensile modulus of about 2400 MPa.

For polyester materials, in particular PET comprising materials, suitable adhesives are isocyanates, in particular aliphatic isocyanantes.

BRIEF DESCRIPTION OF THE DRAWINGS

The invention will be better understood and objects other than those set forth above, will become apparent when consideration is given to the following detailed description thereof. Such description makes reference to the annexed drawing wherein:

FIG. 1 is a schematic transverse sectional view through a plastic coated carrier foil, wherein the dimensions of the thickness of the carrier foil itself and the coatings applied thereto have been shown on an exaggerated or enlarged scale for the purposes of clarity in illustration and explanation of the inventive concepts;

FIG. 2 is a schematic illustration of the coating step for the carrier foil, in this case by means of a slotted die arrangement;

FIG. 3 is an enlarged fragmentary sectional view of the container or tube body prior to the heading thereof, and again wherein the thickness of the various layers of the tube have been exaggerated appreciably for the purpose of clarity and simplification in explanation of the invention; and FIG. 4 is a diagrammatic view showing the step of heading the tube body of FIG. 3, in other words, molding of a tube head or cap to the end of a length of tubing during the production of collapsible tubes pursuant to the present invention.

MODES FOR CARRYING OUT THE INVENTION

The preferably fluid-tight collapsible container is manifested by the features that it comprises a container body formed of a sheet material with both surfaces 2, 3 formed from thermoplastic semi-rigid or rigid layer material, said sheet material comprising a carrier foil 1, said sheet material being folded to a container-like body and sealed in the overlapping edge regions 6, 7, said container-like body having an outer surface 2 coated with a sheathing 9 of elastomeric thermoplastic material of the same kind or type as the layer material to form the container body 5, said container body 5 being provided at one open end with a container head formed from thermoplastic material of the same kind or type as the layer material.

In a preferred embodiment, the collapsible container comprises a functional barrier foil 1 and is fluid-tight, i.e. gas-tight and liquid-tight.

Suitable carrier foils 1 consist of or contain a barrier material, e.g. a barrier foil or a barrier layer. Examples for barrier foils are metal foils such as a aluminum foils, or $SiO_x$ or $Al_xO_y$ coated PET foils or EVOH (ethyl vinyl alcohol) or cycloolefin copolymers (COC). The barrier foil with an additional thermoplastic coating or layer at least on the functional layer, e.g. the $SiO_x$ or $Al_xO_y$ layer, acts as sheet material. Even if the barrier material is a SiOx coated PET foil, such barrier material is preferably on both sides laminated to an additional PET foil. Usually, the barrier foil is used in a thickness of 5 to 50 µm, preferably in a thickness of 12 to 20 µm. The coatings or layers sandwiching the barrier foil are of a thermoplastic semi-rigid or rigid material with a tensile modulus of greater than 1500 MPa, preferably greater than 1800 MPa, more preferred greater than 2100 MPa as determined according to the norm EN ISO 527-1 as outlined above. A very suitable thermoplastic material is e.g. a PET with tensile modulus of about 2800 MPa in a thickness ranging from 12 to 100 µm if only coated on one side and in a thickness of up to at most 50 µm each side if both sides are coated. In some both sides laminated sheet materials a total of 100 µm for both sides may also be acceptable, e.g. 25 µm one side and 75 µm the second side. In a preferred embodiment, both sides of the carrier material or foil, respectively, are fully coated. The thermoplastic coating material can be further selected for additional properties such as medicinal quality (at least the inner coating/layer), chemical inertness, reduced permeability etc. A presently much preferred material is polyesters, in particular PET. Other semi-rigid or rigid materials include polyamide homo- and copolymers and cycloolefin copolymers.

After the carrier foil 1 has been formed and sealed into a container-like body, this container-like body is then coated with an elastomeric sheathing material that makes a chemical bonding with the thermoplastic layer of the sheet material and with the container head forming material. This bonding is best assured by using the same thermoplastic basic material adapted to the specific needs by specific co-monomers and/or additives. The properties desired for this elastic sheathing material are a tensile modulus of 150 to 500 MPa and low stickyness and preferably also high transparency and high chemical inertness. Such coating is generally applied to collapsible tubes in a thickness of 50 to 400 µm, in particular from 160 to 400 µm. For application to other collapsible containers such as bottles other tensile modulus and thicknesses may be favorable, in particular a tensile modulus ranging from 100 to 1500 MPa and thicknesses ranging from 100 to 400 µm.

Turning now to the drawings, and referring specifically initially to FIG. 1, there will be seen a thin barrier foil, in particular a metal foil 1 forming part of the sheet material. Both sides of the barrier foil are coated or rather laminated to a semi-rigid or rigid thermoplastic material 2 and 3. The metal foil 1, for instance constituted by an aluminum foil, or a foil of another metal or metal alloy, is completely gas-tight and liquid-tight. This thin metal foil 1 furthermore is also flexible so that it can be advantageously used for the production of containers, such as collapsible tubes, which during use, undergo a change in shape when the contents are dispensed.

Additionally, the barrier foil 1 can also be formed from one or two layers of non-metallic material, such as layers of fiber material, paper for instance. This non-metallic material itself can be fluid-tight or can be treated previously according to any appropriate technique suitable for such purpose to render same fluid-tight. Moreover, barrier foil 1 can also be composed of several different materials and can consist of, for example, a paper sheet laminated with a metal foil, such as an aluminum foil, or of a plastic foil, e.g. a PET foil, with a functional layer, e.g. a SiOx layer, on one or optionally both sides. If the plastic foil fulfills all requirements of a thermoplastic surface of the sheet material it is sufficient to apply a further thermoplastic layer on the one functional layer.

By appropriately selecting the nature of the barrier foil material, it is possible to obtain additional properties for the container wall apart from the fluid-tightness and flexibility discussed above, such as for instance protection of the filled container contents against radioactive radiation. To this end, a lead foil or a foil containing lead can be used in or as the barrier foil 1. Owing to the coating of the barrier foil with at least one, preferably two thermoplastic layers 2, 3 the carrier foil itself does not contact the contents of the container, so that the properties of the foil which themselves might be or are detrimental to the filled container contents, such as the toxic effect of a lead-containing foil on an edible substance filled into the container, or a filled in substance coming into contact with the human body e.g. topically, need not be particularly considered. Owing to the thermoplastic layer, there is complete isolation of the material of the foil from the container contents. If further protection of a filled in substance is assumed necessary, e.g. in case of a porous thermoplastic layer, the barrier coating may be provided with ah additional protective barrier coating or layer, e.g. a metal foil of a harmless metal or an especially well isolating plastics foil or coating may be applied and forms part of the carrier/barrier foil.

An at least one side plastics coated barrier foil may be purchased or prepared by coating the impervious strip-shaped carrier foil 1, while in flat condition, preferably on both sides, with a thin layer of heat-sealable semi-rigid to rigid plastic material 2, 3. The coating operation can be performed, for instance, through the use of a suitable standard slotted die 4 by means of which the plastic is applied to the carrier foil 1 which may be in the form of a continuous web. Of course, other types of coating hardware suitable for application of a plastic film to a foil are capable of being used in the practice of the instant invention.

In an alternative—and presently preferred—method, the carrier foil 1 is laminated with one or two plastics foils 2,3, one on each side, using an adhesive layer (not shown).

Embedding of the carrier foil 1 in the plastic layers 2 and 3 ensures that the barrier foil itself no longer makes direct contact with the filling substance, i.e. the substance filled into the container, conveniently termed the container or tube contents. The composition of the plastic material applied to the carrier foil 1 can be chosen such that it is compatible with the container contents without requiring that consideration be given to the fact whether the plastic material itself, which is suitable for contact with the container contents, is also gas-tight, has sufficient strength to form the container wall, or presents other properties required for its use as a container structure.

If the carrier foil 1 is coated with plastics, it is preferred that the plastic used for coating that side or face of the carrier foil 1 which later on is to constitute the inner wall or inside of the container or tube, engages about the lateral edges 6, 7 of the foil 1, as best shown by referring to FIG. 1. It is further preferred that the lateral edges will be substantially flush with the other coated side of the foil which is to constitute the outside surface of the container or tube.

It may be desirable or advantageous to coat the two sides of the carrier foil 1 with different materials. However, for compatibility reasons it is preferred that also in the case of different plastics they are of the same basic plastics type such as e.g. PET at most differing by its additives or comprising different co-monomers etc. Hence, the plastic material used for coating the side of the foil which later on during fabrication will constitute the inside of the container or tube, conveniently indicated by the plastic layer 2, can be chosen according to the requirements imposed upon contact of this plastic layer 2 with the filled substance of the container, e.g. foodstuff or pharmaceutical grade quality, while the other plastic material for forming the coating or layer 3 of the other side of the foil 1, later on during fabrication to constitute the outside surface of the container body prior to sheathing, can e.g. be chosen from less pure material. Selective coating of both sides of the carrier foil 1 with different materials of the same kind therefore provides optimum accommodation of the inside and outside surfaces of the container body to prevailing requirements.

In order to produce collapsible containers or tubes or tube-shaped container bodies, the coated or laminated carrier foil 1 (the sheet material) is wound or rolled cylindrically or helically, as desired, in a well-known manner such as to form a tube-like body 5 with the lateral edges 6 and 7 of the coated foil 1 which are subsequently to be bonded to one another disposed in overlapping fashion. In this connection, attention is invited to FIG. 3 showing the overlapping arrangement of the lateral edges 6,7. The longitudinal seam 8 which, depending on the technique of winding the carrier foil 1, in the first instance extends parallel to the tube axis, and in the second instance, extends helically, is then heat-sealed.

Winding of the coated carrier foil 1 or sheet material into a tube can be undertaken in one or in several layers. Moreover, the seam 8 can be made as a simple overlapping seam, or the overlapping portions can be folded or rolled one into the other prior to heat-sealing.

After having formed the tube-like body from the coated strip of carrier material, this tube-like body will next be sheathed all around with a further coating, a sheathing 9 of elastomeric thermoplastic material in order to cover the overlapping seam 8 of the tube 5, as best depicted in FIG. 3, and to thereby obtain a tube body with a completely smooth outer surface of the tube body and a more uniform wall thickness. The sheathing 9 may be formed by an extrusion technique.

It is important that the elastomeric thermoplastic material constituting the sheathing 9 be applied to the tube 5 in such a controlled way as regards the amount of material and its distribution along the outside surface of the tube, that the tube with the sheathing located thereon will possess an outside surface, the shape and dimension of which substantially corresponds to the internal receiving wall 22 of the molding cavity 11 of the molding equipment for heading the tube. The molding equipment, specifically an injection mold 10 placed over the free end of a tube body 5 formed in accordance with the method heretofore discussed, is shown in FIG. 4. Mold 10 is suitable for applying a tube heading or tube cap. Mold unit 10 can also be a pressure mold. The mold unit 10 is preferably formed of an outer part 20 with an inner wall 22 and an inner part 21 that together with the inserted part 5a of tube body 5 form a mold cavity 11 possessing the desired shape or configuration of the tube head or cap to be formed. The tube body may be cut into finite sections if it is of such length that a number of tubes should be formed from the initially produced tube structure, and then each such tube section, i.e. tube body 5, can be placed upon a conventional and therefore non-illustrated mandrel prior to insertion of one end 5a of such tube into the confines of the mold cavity 11. Owing to the fact that the sheathing of the tube 5 provides a completely smooth outer surface for the tube, there is obtained a precise and snug fit at location 12 between the mold 10 and the outer surface of the tube 5 itself. Consequently, there is effectively prevented leakage of the moldable material between the mold and the outer tube surface during the actual injection molding operation.

Due to the fact that the inner mold portion or part 21 has a stepped region 23 which serves to expose the inside wall of the tube body 5 at least at the end portion 5a thereof received within the mold cavity 11, the moldable plastic material which appears in the mold cavity 11 under increased pressure can flow into the interior of at least the end portion 5a of the tube body 5 received in the mold unit 10, to thereby apply a radially directed or outwardly extending force against the inner wall of such end portion 5a of the tube 5. This outwardly directed or radial force tends to further urge the outside surface of the end portion 5a of the tube 5 into even greater contact with the internal receiving wall 22 of the mold cavity 11, thereby further promoting the aforementioned sealing action which is effectively provided by this method. Consequently, it is not necessary to provide additional sealing arrangements for the mold unit.

Application of the sheathing 9 can be effected in one or several layers with slightly differing features. For example, if desired at least an outer layer of the sheathing may be selected such that it does not only provide the desirable elasticity and sealing effect noted above, but may additionally serve as a carrier element for an imprint to be made on the outer surface of the tube. In addition, one or more of the sheathing layers may be colored.

If the thermoplastic semi-rigid or rigid coating of the sheet material and the head forming material are sensitive to humidity such as most PET materials, it is preferred or even necessary to dry the sheet material and the head forming material prior to any application of heat, i.e. prior to use and use it in a dry environment.

In order to obtain an increased safety of the container structure against contact of the container contents with the barrier layer and to prevent such contact in any event, even when, for instance, the plastic layer applied to the carrier foil is defective or, for instance, contains pores or openings, it can be desirable to provide the side of the barrier foil facing the container contents with a further barrier layer (protective barrier layer or sheet) to generate a composite barrier foil prior to the application of the thermoplastic layer to form the sheet material as heretofore described. Hence, a protective barrier layer, e.g. a foil of a "harmless" metal or plastics, such as for instance aluminum, polyester, polyamide, and so forth, can be laminated to or bonded to the "harmful" barrier layer to form the barrier foil. The plastic coating layer 2 or 3 which is then intended to make actual contact with the container contents or filled-in substance is subsequently applied on top of the barrier foil in the heretofore described manner.

It is preferable if the carrier material is also impervious to light. However, the carrier material could also be slightly transparent in order to provide a translucent container structure.

Hence, with the inventive technique of fabricating containers or tubes, it is possible to provide a collapsible container body which, at the same time, is gas-tight and impervious to liquids as well as to light and also resistant to solvents.

While there are shown and described presently preferred embodiments of the invention, it is to be distinctly understood that the invention is not limited thereto but may be otherwise variously embodied and practiced within the scope of the following claims.

The invention claimed is:

1. A collapsible container which recovers after deformation under pressure that comprises:
   a container body formed of a sheet material having an inner surface and an outer surface said surfaces formed from thermoplastic layer material having a tensile modulus of greater than 1500 MPa as determined by EN ISO 527-1, and a carrier foil layer,
   said sheet material being folded to form said container body and sealed in overlapping edge regions,
   wherein the outer surface of said container body is coated with a sheathing of elastomeric thermoplastic material,
   said container body being provided at one open end with a container head formed from thermoplastic material
   wherein adhesion can be achieved between the materials of the container body, sheath and head thereby providing a physical connection between the materials.

2. The collapsible container of claim 1, which is air-tight and liquid-tight and wherein the carrier foil layer is a barrier layer.

3. The collapsible container of claim 1, wherein the total thickness of the thermoplastic layer material is at most about 200 μm.

4. The collapsible container of claim 1, wherein the tensile modulus (23° C.) of the sheathing material is from 50 to 1000 MPa.

5. The collapsible container of claim 1, wherein the tensile modulus (23° C.) of the sheathing material is from 150 to 500 MPa.

6. The collapsible container of claim 1, wherein the tensile modulus (23° C.) of the sheathing material is about 180 to about 400 MPa.

7. The collapsible container of claim 1, wherein the thickness of the sheathing is from 50 to 400 μm.

8. The collapsible container of claim 1, wherein the carrier foil consists of a barrier layer or foil.

9. The collapsible container of claim 1, wherein the carrier foil comprises an aluminum foil.

10. The collapsible container of claim 1, wherein the carrier foil has a thickness of 5 to 50 μm.

11. The collapsible container of claim 1, wherein the thermoplastic layer material is a polyester material.

12. The collapsible container of claim 1, wherein the container body is a tube-like body formed of a sheet material with a total thickness of 50 to 250 μm, said sheet material comprising:
   a carrier foil layer which is a barrier foil having a thickness of 5 to 50 μm which is laminated on each side with a thermoplastic polymer layer having a thickness of 10 to 100 μm and an adhesive layer having a thickness of 3 to 10 μm between each thermoplastic polymer layer and the carrier foil.

13. The collapsible container of claim 1, wherein the container body is a tube-like body formed of a sheet material with a total thickness of 80 to 100 μm, said sheet material comprising:
   an aluminum carrier foil layer which is a barrier foil having a thickness of 12 to 20 μm which is laminated on each side with a thermoplastic polyester layer material having a thickness of 30 μm and an adhesive layer having a thickness of 3 to 10 μm between each thermoplastic polyester layer material and said carrier foil.

14. The collapsible container of claim 1, wherein the sheathing material has a thickness of 150 to 400 μm.

15. The collapsible container of claim 1, comprising a container body with wall thickness of 150 to 500 μm.

16. The collapsible container of claim 1, comprising a container body with wall thickness of 230 to 500 μm.

17. The collapsible container of claim 1, wherein at least the inner thermoplastic layer material is of food grade or pharmaceutical grade polyester.

18. The collapsible container of claim 1, wherein said container head is a tube head made of tube heading material, and wherein the thermoplastic polymer layer material, the elastomeric thermoplastic sheathing material and the tube heading material are all polyester based materials, the sheathing material is of a thermoplastic polyester elastomer and the tube heading material is a copolyester.

19. A method for the production of a collapsible container of claim 17, comprising:
   (i) providing an impervious, substantially strip- or web-shaped sheet material comprising a carrier foil having a heat-sealable thermoplastic layer on at least one side,
   (ii) forming the sheet material to the shape of the container body by overlapping adjacent edges of the sheet material,
   (iii) heat-sealing the adjacent overlapped edges of the sheet material to form a tube-like body,
   (iv) applying a sheathing of elastomeric thermoplastic material over the heat-sealed container body to cover the outside of the tube-like body to form a container body,
   (v) controlling the application of the elastomeric thermoplastic sheathing to the tube-like body such that the shape and dimension of the outside surface of the sheathed tube-like body or container body substantially corresponds to the shape and dimension of an inner wall of a mold cavity of a tube heading mold,
   (vi) inserting at least an open end portion of the sheathed container body into the mold cavity of the tube heading mold, with at least the outside surface of the end portion of the sheathed container body received in the mold cavity in sealing contact against the inner wall of the mold cavity, and with the inner wall of the end portion of the container body received in the mold being spaced from an inside wall of said inner mold part, and
   (vii) introducing moldable thermoplastic material into the mold cavity and into contact with the open end portion of the container body for forming the tube head,
   wherein adhesion can be achieved between the material of the container body, sheath and head thereby providing a physical connection between the materials.

20. The collapsible container of claim 1, wherein said thermoplastic layer material is polyester, and wherein said thermoplastic layer material is laminated to said carrier foil layer by an isocyanate adhesive and said carrier foil layer is a metal foil.

21. The collapsible container of claim 1, wherein said thermoplastic layer material is polyethylene terephthalate (PET), and wherein said thermoplastic layer material is laminated to said carrier foil layer by an aliphatic isocyanate adhesive layer and said carrier foil layer is aluminum.

22. The collapsible container of claim 12, wherein the thermoplastic layer material is a PET or PET-P material.

23. The collapsible container of claim 17, wherein at least the inner thermoplastic layer material is of food grade or pharmaceutical grade PET or PET-P material.

24. The collapsible container of claim 1, wherein the thermoplastic layer material is polyethylenterephthalate, the elastomeric sheathing material is a polybutylene terephthalate copolymer, and the container head is made of a copolyester tube heading material.

\* \* \* \* \*